UNITED STATES PATENT OFFICE.

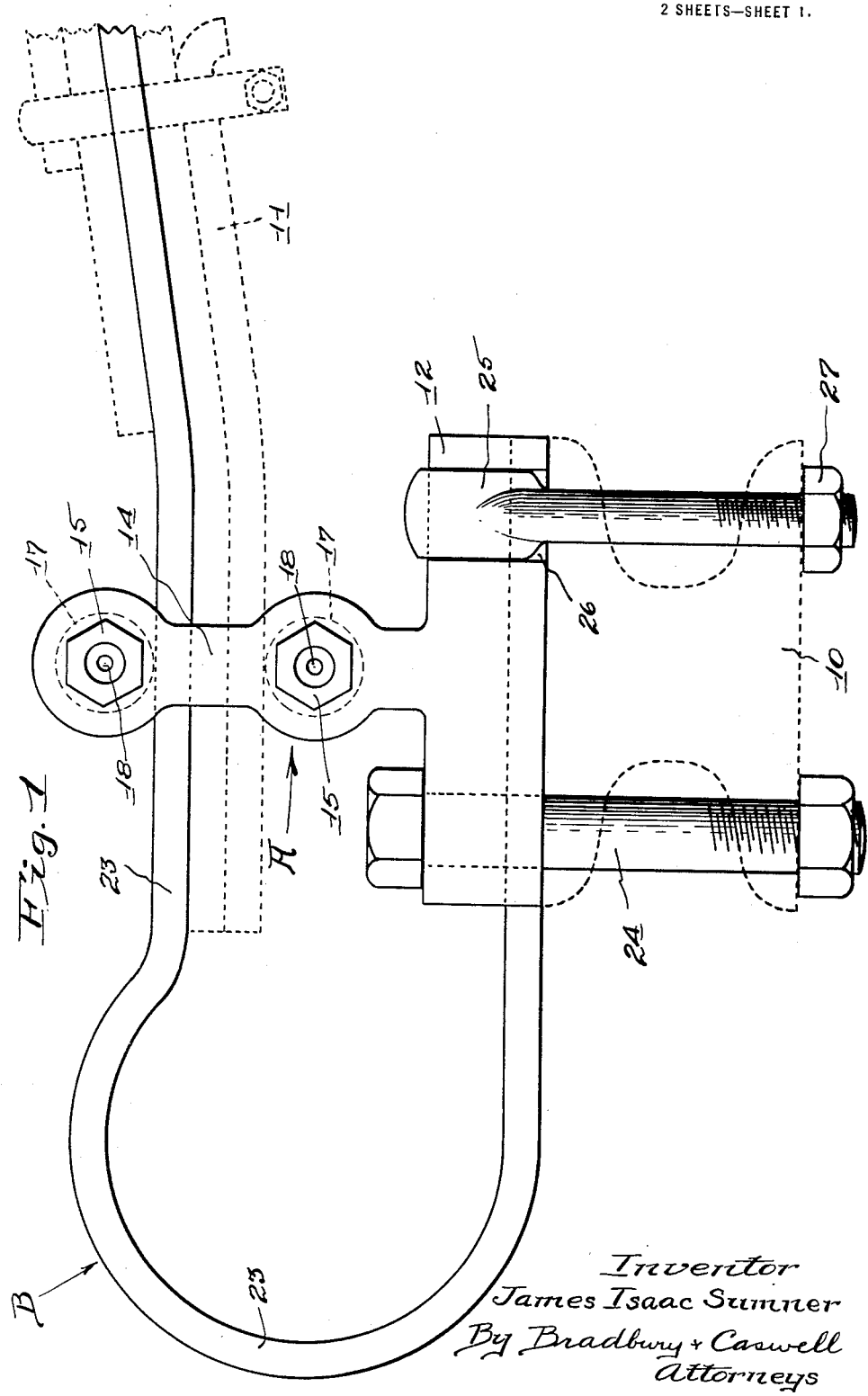

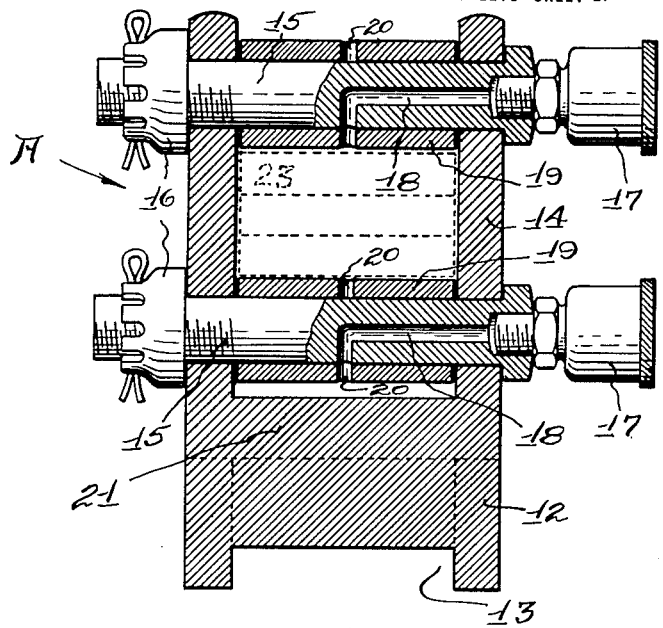
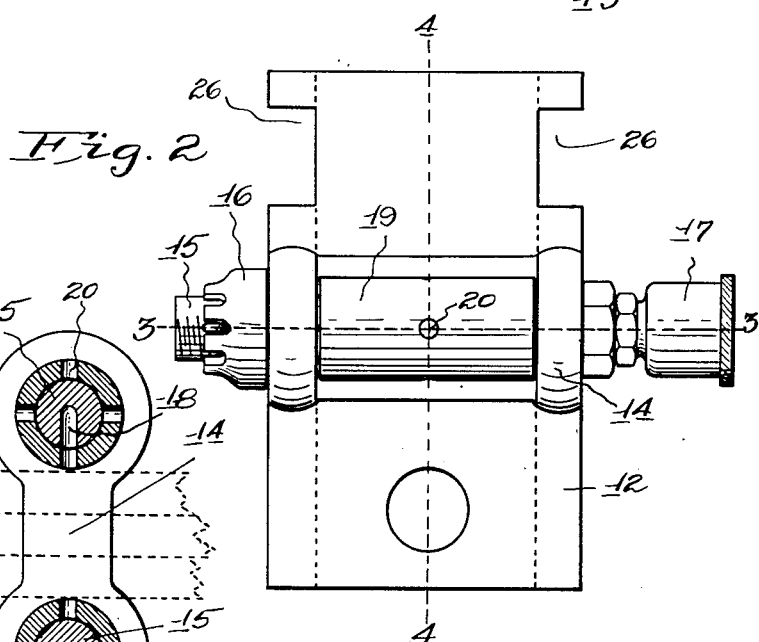
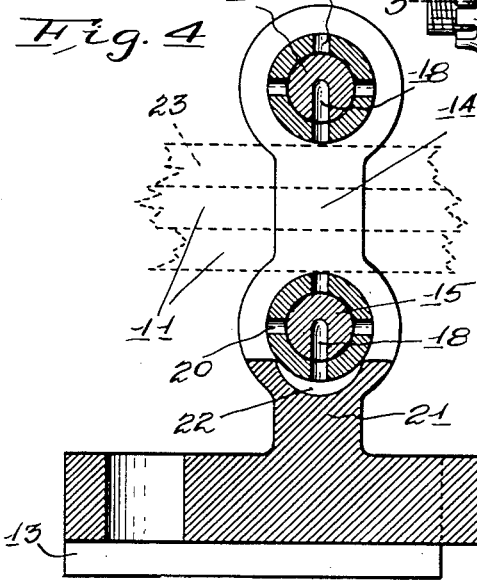

JAMES ISAAC SUMNER, OF MINNEAPOLIS, MINNESOTA, ASSIGNOR OF ONE-HALF TO ANTON G. SCHIMMING, OF MINNEAPOLIS, MINNESOTA.

SHOCK-ABSORBER.

1,387,812. Specification of Letters Patent. Patented Aug. 16, 1921.

Application filed April 5, 1920. Serial No. 371,247.

*To all whom it may concern:*

Be it known that I, JAMES ISAAC SUMNER, a citizen of the United States, residing at Minneapolis, in the county of Hennepin and State of Minnesota, have invented a new and useful Shock-Absorber, of which the following is a specification.

My invention relates to improvements in shock absorbers.

In automobiles, employing front cantaliver springs, shocks and jars are transmitted, in travel, longitudinally through said springs to the chassis, thus racking the same and all parts connected thereto and, further, subjecting the front tires to undue strains.

It is the object of my present invention to supplement the ordinary cantaliver spring suspension by a novel attachment designed to be applied to a stock car or to be incorporated in the car when constructed at the factory, whereby such shocks and jars are cushioned and the strains upon the tires are minimized.

More specifically it is my object to supply a longitudinally slidable mounting for the lower end of the cantaliver spring adapted to be secured upon an axle in the position where said end of said spring is ordinarily fastened and further to provide a connection between said spring and axle designed to yield and permit a limited horizontal movement of the axle with respect to said spring.

A further object is to provide a non-frictional mounting for the end of a cantaliver spring, designed to be secured to an axle of a vehicle and adapted to permit horizontal movements of said axle with respect to said spring, together with a yielding connection between said axle and spring to limit such movements.

With the foregoing and other objects in view, which will appear in the following description, the invention resides in the novel combination and arrangement of parts and in the details of construction hereinafter described and claimed.

In the drawings, Figure 1 is an elevation illustrating one embodiment of my improved shock absorber. Fig. 2 is a plan view of the shackle and Figs. 3 and 4 are sectional views taken respectively on the lines 3—3 and 4—4 of Fig. 2, the end of a spring supported in the shackle being illustrated in dotted lines.

Referring to the drawings, I have used the reference numeral 10 to indicate an axle of a vehicle, and the numeral 11 to indicate a cantaliver spring of ordinary design, commonly embodied in automobile construction.

The usual practice is to firmly and rigidly secure springs of this type to the axle of a vehicle. Such construction provides for carrying the weight of the vehicle chassis and absorbs to a great extent, vertical shocks and jars occasioned in travel. This construction does not, however, efficiently cushion shocks or jars occasioned by the striking of the front wheels against obstructions in travel. My improved device does not disturb the functioning of the spring, so far as the cushioning of vertical shocks is concerned, and it provides for cushioning horizontal shocks or jars which are otherwise transmitted through the spring to the chassis of the vehicle.

My improved shock absorber includes a shackle A, designed to slidably receive the spring 11, and a yielding member B incorporated in or attached to said spring and also secured to the axle of the vehicle, said yielding member being adapted to limit, under tension, horizontal movements between said spring and axle.

The shackle A comprises a block 12, having a longitudinal recess 13 in the bottom thereof, posts 14 formed integrally with the block 12 and carrying bolts 15, one above the other, said bolts being secured in said posts by means of nuts 16 fitted thereon.

A compression grease cup 17 threaded in one end of each bolt communicates with a lubricating passageway 18 which opens at the periphery of the bolt in the middle thereof. Sleeves or rollers 19 are journaled on these bolts, said rollers being formed with openings 20 therein arranged to register with the outlets of said lubricating passageways. A web 21, extending between the bases of the posts 14, is grooved at its upper edge to form a grease receiving trough 22 in which the lower roller 19 turns. The block 12 of the shackle A is seated upon the upper side of the axle 10 and the end of the spring 11 rests between the rollers 19. A spring leaf 23 is substituted for one of the stock leaves in the spring 11, said leaf being considerably longer than the original leaf, and looped forwardly of the shackle as seen in Fig. 1, the end of said leaf being seated within the recess 13 in the bottom of the block 12. Said end of said spring leaf and the block 12 are clamped to the axle 10 by means of a bolt 24, passing through said block, spring leaf and axle, and a clip 25 fitted in depressions 26 in said block and embracing the same, the ends of said clip passing through the axle and fitted at their lower ends with nuts 27.

In use, the shackle A prevents vertical movements between the axle 10 and spring 11, but permits horizontal movements of said axle with respect to said spring, such movements being under tension of the looped spring leaf 23. Said spring leaf 23 operates to cushion shocks or jars tending to drive the axle rearwardly, thus minimizing the shocks ordinarily transmitted through the spring 11 to the chassis of the vehicle, and further reducing the effect of impacts against the tires on the vehicle wheels.

My device is particularly advantageous in that it enhances the riding quality of the vehicle and prolongs the life thereof, by materially reducing vibration, shocks or jars to the chassis and undue strains upon the tires of the vehicle.

Changes in the specific form of my invention, as herein disclosed, may be made within the scope of what is claimed without departing from the spirit of my invention.

Having described my invention, what I claim as new and desire to protect by Letters Patent is:

1. In a device of the class described, the combination with a chassis supporting spring and axle of a vehicle, of a connecting element joining the spring and axle and yieldingly limiting the horizontal movements of one with respect to the other, and a supporting slide between said spring and axle designed to carry the weight of the vehicle chassis.

2. In a device of the class described, the combination with a cantaliver spring and axle of a vehicle of shackle secured to said axle and designed to receive said spring and permit the same to move horizontally with respect to said axle and a looped member connected to the spring at one end and to the axle at the other end thereof, said member being designed to yieldingly hold said spring and axle in normal horizontal relation.

3. In a device of the class described, the combination with a cantaliver spring and axle of a vehicle of a shackle including a block, designed to be secured to said axle, posts on said block, rollers journaled horizontally on said posts, said rollers being arranged to slidably receive between them the end of said spring, and a spring leaf incorporated in said spring, said leaf being looped forwardly of the spring proper, the end thereof being turned back and secured to the axle, as and for the purposes described.

4. In a device of the class described, a shackle designed to rest upon the axle of a vehicle and comprising a block, posts on said block, bolts mounted horizontally in said posts, one above the other and rollers journaled on said bolts, a spring leaf incorporated in a cantaliver spring of the vehicle, said rollers being adapted to receive the lower extremity of said spring, and said leaf being extended forwardly thereof, thence turned downwardly and rearwardly, the end of said leaf being passed beneath said block and means for clamping said block and spring leaf upon the axle.

5. In a device of the class described, a shackle designed to rest upon the axle of a vehicle and comprising a block, with a longitudinal recess in the bottom thereof, posts on said block, bolts mounted horizontally in said posts, one above the other, and rollers journaled on said bolts, said block having a grease receiving trough in which the lower roller turns, and a spring leaf incorporated in a cantaliver spring of the vehicle, said rollers being adapted to receive the lower extremity of said spring, and said leaf being extended forwardly thereof, thence turned downwardly and rearwardly, the end of said leaf being fitted in the recess in said block and means for clamping said block and spring leaf upon the axle.

6. In a device of the class described, a shackle designed to rest upon the axle of a vehicle and comprising a block with a longitudinal recess in the bottom thereof, posts on said block, bolts mounted horizontally in said posts, one above the other, and rollers journaled on said bolts, each bolt being formed with an axial passageway open at the periphery thereof, a grease cup threaded in each bolt and communicating with the passageway therein, said block having a grease receiving trough in which the lower roller turns, a spring leaf incorporated in a cantaliver spring of the vehicle, said rollers being adapted to receive the lower extremity of said spring and said leaf being extended forwardly thereof, thence turned downwardly and rearwardly, the end of said leaf being fitted in the recess in said block and means for clamping said block and spring leaf upon the axle.

In testimony whereof, I have signed my name to this specification.

JAMES ISAAC SUMNER.